US012676746B2

(12) United States Patent
Powers et al.

(10) Patent No.: US 12,676,746 B2
(45) Date of Patent: Jul. 7, 2026

(54) RECOVERY USING AN ENCRYPTED FALLBACK KEY IN METADATA

(71) Applicant: International Business Machines Corporation, Armonk, NY (US)

(72) Inventors: Eysha Shirrine Powers, Los Angeles, CA (US); Cecilia Carranza Lewis, San Jose, CA (US); Eric David Rossman, Hopewell Junction, NY (US); Garry Joseph Sullivan, Rochester, MN (US); Michael Joseph Jordan, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 18/638,416

(22) Filed: Apr. 17, 2024

(65) Prior Publication Data

US 2025/0330311 A1 Oct. 23, 2025

(51) Int. Cl.
*H04L 9/08* (2006.01)

(52) U.S. Cl.
CPC .................................. *H04L 9/0894* (2013.01)

(58) Field of Classification Search
CPC ...................................................... H04L 9/0894
USPC .......................................................... 380/286
See application file for complete search history.

(56) References Cited

U.S. PATENT DOCUMENTS 9,904,788 B2 * 2/2018 Kumar .................. H04L 9/0825
10,148,437 B2 12/2018 Pogmore et al.

11,640,484 B1 5/2023 Kumar
2004/0039925 A1 2/2004 McMillan et al.
(Continued)

FOREIGN PATENT DOCUMENTS

CN 103916237 B 2/2017
JP 2003198524 A 7/2003
(Continued)

OTHER PUBLICATIONS

Barker et al., "A Profile for U.S. Federal Cryptographic Key Management Systems" NIST Special Publication 800-152, Oct. 2015, 147 pages, URL:https://nvlpubs.nist.gov/nistpubs/Spec ialPublications/NIST.SP.800-152.pdf.
(Continued)

*Primary Examiner* — Linglan Edwards
*Assistant Examiner* — Phuc Pham
(74) *Attorney, Agent, or Firm* — Aaron N. Pontikos

(57) ABSTRACT

A computer-implemented method (CIM), according to one approach, includes generating a primary cryptographic recovery key, and generating an alternate cryptographic recovery key, where the alternate cryptographic recovery key is generated and stored in a cryptographic Hardware Security Module (HSM). The method further includes storing an encrypted fallback key in metadata associated with a data set, where the encrypted fallback key is an operational key encrypted by the primary cryptographic recovery key, and storing a Recovery Key Verification Pattern (RKVP) in the metadata, where the RKVP is associated with the primary cryptographic recovery key and is stored for the primary cryptographic recovery key. In response to a determination that the operational key is unavailable, the encrypted fallback key is retrieved to perform a data decryption operation.

20 Claims, 10 Drawing Sheets

(56)  References Cited

U.S. PATENT DOCUMENTS

| | | | |
|---|---|---|---|
| 2019/0222419 A1* | 7/2019 | Adams | G06F 21/45 |
| 2020/0304302 A1* | 9/2020 | Henderson | G06F 21/602 |
| 2022/0358251 A1 | 11/2022 | Saluja et al. | |

FOREIGN PATENT DOCUMENTS

| | | |
|---|---|---|
| TW | 201116024 A | 5/2011 |
| TW | I458320 B | 10/2014 |
| WO | 2025/219778 A1 | 10/2025 |

OTHER PUBLICATIONS

International Searching Authority, "Notification of Transmittal of the International Search Report and the Written Opinion of the International Searching Authority, or Declaration," Patent Cooperation Treaty Jul. 1, 2025, 11 pages, International Application No. PCT/ IB2025/052868.

Wikipedia, "Key (cryptography)," Wikipedia, 2024, 5 pages, retrieved from https://en.wikipedia.org/wiki/Key_(cryptography).

IBM, "What is SAF? Security on z/OS," IBM, 2010, 2 pages, retrieved from https://www.ibm.com/docs/en/zos-basic-skills?topic=zos-what-is-saf.

IBM, "The Cryptographic Key Data Set (CKDS)," IBM, Mar. 3, 2021, 2 pages, retrieved from https://www.ibm.com/docs/bg/zos/2.3.0?topic=icsf-cryptographic-key-data-set-ckds.

* cited by examiner

100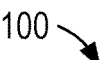

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

CRYPTOGRAPHIC KEY RECOVERY CODE

150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

RECOVERY USING AN ENCRYPTED FALLBACK KEY IN METADATA

BACKGROUND

The present invention relates to security of data sets, and more specifically, this invention relates to cryptographic keys.

A cryptographic key is information that is stored in a file, and when used, is proceeded by a cryptographic algorithm in order to encrypt and decrypt cryptographic data. The cryptographic key is usually in the form of a string of numbers or letters. Key lifecycle management refers to the creation and retirement of cryptographic keys. This is commonly referred to as "key rollover."

SUMMARY

A computer-implemented method (CIM), according to one approach, includes generating a primary cryptographic recovery key, and generating an alternate cryptographic recovery key, where the alternate cryptographic recovery key is generated and stored in a cryptographic Hardware Security Module (HSM). The method further includes storing an encrypted fallback key in metadata associated with a data set, where the encrypted fallback key is an operational key encrypted by the primary cryptographic recovery key, and storing a Recovery Key Verification Pattern (RKVP) in the metadata, where the RKVP is associated with the primary cryptographic recovery key and is stored for the primary cryptographic recovery key. In response to a determination that the operational key is unavailable, the encrypted fallback key is retrieved to perform a data decryption operation.

A computer program product (CPP), according to another approach, includes a set of one or more computer-readable storage media, and program instructions, collectively stored in the set of one or more storage media, for causing a processor set to perform any combination of features of the foregoing methodology.

A computer system (CS), according to another approach, includes a processor set, a set of one or more computer-readable storage media, and program instructions, collectively stored in the set of one or more storage media, for causing the processor set to perform any combination of features of the foregoing methodology.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach of the present invention.

DETAILED DESCRIPTION

Figure 2A:
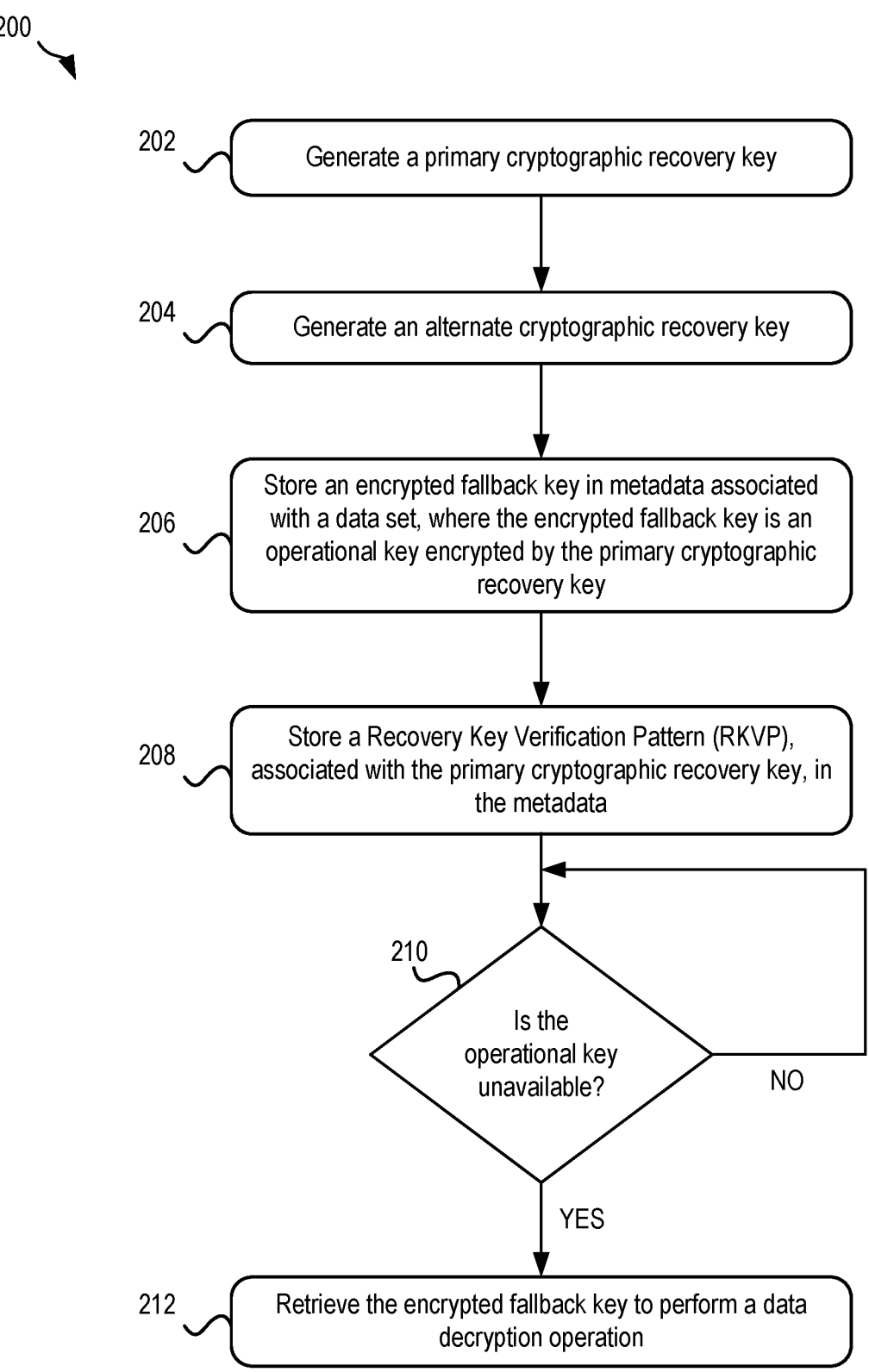
FIG. 2A is a flowchart of a method, in accordance with one approach of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for recovery using an encrypted fallback key in metadata.

In one general approach, a CIM includes generating a primary cryptographic recovery key, and generating an alternate cryptographic recovery key, where the alternate cryptographic recovery key is generated and stored in a cryptographic Hardware Security Module (HSM). The method further includes storing an encrypted fallback key in metadata associated with a data set, where the encrypted fallback key is an operational key encrypted by the primary cryptographic recovery key, and storing a RKVP in the metadata, where the RKVP is associated with the primary cryptographic recovery key and is stored for the primary cryptographic recovery key. In response to a determination that the operational key is unavailable, the encrypted fallback key is retrieved to perform a data decryption operation.

Technical effects of creating the keys described above (and particularly the fallback key) and thereafter having the fallback key available for retrieving in response to a determination that the operational key is unavailable include the mitigation of latency and processing consumption that is otherwise incurred in conventional data storage systems upon an operational key becoming unavailable. This also preserves user data that would otherwise be lost, as manual decryption is not feasible for recovering user data encrypted by the lost encryption key(s). More specifically, the processing and delays that are avoided as a result of enabling and using the fallback key described herein, may be broken down as follows. Recovery of the user data is made possible in seconds rather than such recovery being otherwise impossible to perform. Furthermore, backup key data sets do not need to be located, and therefore use of the fallback key described herein mitigates minutes of time that would otherwise be expended to locate such data sets. The at least minutes that would otherwise be used to search each backup key data set for the lost key (in an attempt to recover from a lost encryption key) is also avoided based on the fallback key being available. This has the technical effect of a reduction in latency and a reduction in processing overhead. At least minutes that would otherwise be incurred to determine whether backup key data sets have the same master key as the active key data set, and hours to load new resources to rotate the master key of the backup key data set to match the active key data set are also no longer incurred based on the technical effect of the techniques described herein for using a fallback key. The hours that would otherwise be incurred to extract a key from the backup key data set are also avoided, thereby further refining recovery from an unavailability of an operational key.

Retrieving the encrypted fallback key may include: determining whether an RKVP associated with a key label of a request for the data set matches the primary cryptographic recovery key. Retrieving the encrypted fallback key may also include: in response to a determination that the RKVP associated with the key label matches the primary cryptographic recovery key: using the primary cryptographic recovery key to decrypt the encrypted fallback key, using a current master key stored in the cryptographic HSM to encrypt the decrypted fallback key, generating a protected key to be used for encrypting and decrypting the data set, and storing the master key encrypted fallback key in a Cryptographic Key Data Set (CKDS).

Technical effects of retrieving the fallback key include the mitigation of latency and processing consumption that is otherwise incurred in conventional data storage systems. These technical effects also include the preservation of user data that would otherwise be lost, as manual decryption is not feasible for recovering user data encrypted by the lost encryption key(s).

The method may further include determining whether the RKVP associated with the key label matches the RKVP stored in the metadata, and in response to a determination that the RKVP associated with the key label does not match the RKVP stored in the metadata, storing the master key encrypted fallback key and the RKVP associated with the key label to the metadata.

Technical effects of retrieving the fallback key include the mitigation of latency and processing consumption that is otherwise incurred in conventional data storage systems. These technical effects also include the preservation of user data that would otherwise be lost, as manual decryption is not feasible for recovering user data encrypted by the lost encryption key(s).

The determination that the operational key is unavailable may be based on a key label for the alternate cryptographic recovery key being deleted.

A technical effect of having the encrypted fallback key available for instances in which the operational key is unavailable includes the ability to immediately begin recovery of a lost key upon a determination that a loss event has occurred, e.g., malicious deletion, inadvertent deletion, etc., rather than having to perform a time and resource intensive recovery process. Note that such a recovery process would only ultimately reveal the conclusion that the associated data set is lost, and does not provide the recovery enabled herein.

The data set may be encrypted by the operational key. The method may further include receiving a request for the data set, and in response to receiving the request for the data set, performing a predetermined maintenance process. The predetermined maintenance process may include causing the cryptographic HSM to generate and return a protected key to be actively used for encryption and decryption of the data set, determining whether an RKVP associated with a key label of the request for the data set matches the primary cryptographic recovery key, and in response to a determination that the RKVP associated with a key label does not match the primary cryptographic recovery key, generating a new fallback key. The new fallback key may be encrypted by the primary cryptographic recovery key.

A technical effect of performing the predetermined maintenance process to maintain the fallback key within infrastructure includes preventing the occurrence of an RKVP and a recovery key not matching from delaying recovery procedures from being performed in the event that an encryption key is lost, and furthermore, mitigates delay (that would otherwise occur based on the mismatch existing) from occurring in a subsequent request for opening the data set.

The method may further include causing the RKVP associated with a key label to be compared with the RKVP stored in the metadata, and in response to a determination, from results of the comparison, that the RKVP associated with a key label does not match the RKVP stored in the metadata, causing the new fallback key and the RKVP associated with a key label to be stored in the metadata.

A technical effect of storage of the new fallback key and the RKVP associated with a key label in metadata ensures that the mismatch is correct for a subsequent opening of the data set. This reduces the amount of processing that would otherwise be performed if the mismatch were allowed to continue to exist.

Retrieving the encrypted fallback key may include determining whether an RKVP associated with a key label of a request for the data set matches the primary cryptographic recovery key. In response to a determination that the RKVP associated with the key label does not match the primary cryptographic recovery key, a determination may be made as to whether the RKVP associated with the key label matches the alternate cryptographic recovery key. In response to a determination that the RKVP associated with the key label does not match the alternate cryptographic recovery key, a failure may be returned to a device from which request for the data set is received. Furthermore, in response to a determination that the RKVP associated with the key label matches the alternate cryptographic recovery key, a predetermined recover process may be performed. The predetermined recover process may include using the alternate cryptographic recovery key to decrypt the encrypted fallback key, encrypting the decrypted encrypted fallback key with a current master key, encrypting the decrypted fallback key with the primary cryptographic recovery key and returning the primary cryptographic recovery key encrypted fallback key and the RKVP associated with the key label to the device, generating a protected key to be actively used for encryption and decryption of the data set, and causing the master key encrypted fallback key and the RKVP associated with the key label in a Cryptographic Key Data Set (CKDS).

Technical effects of retrieving the fallback key for performing a recovery include the mitigation of latency and processing consumption that is otherwise incurred in conventional data storage systems. These technical effects also include the preservation of user data that would otherwise be lost, as manual decryption is not feasible for recovering user data encrypted by the lost encryption key(s).

The predetermined recover process may include determining whether the RKVP associated with the key label matches the RKVP stored in the metadata, and in response to a determination that the RKVP associated with the key label does not match the RKVP stored in the metadata, causing the primary cryptographic recovery key encrypted fallback key and the RKVP associated with the key label to be stored in the metadata.

Technical effects of retrieving the fallback key for performing a recovery include the mitigation of latency and processing consumption that is otherwise incurred in conventional data storage systems. These technical effects also include the preservation of user data that would otherwise be lost, as manual decryption is not feasible for recovering user data encrypted by the lost encryption key(s).

In another general approach, a CPP includes a set of one or more computer-readable storage media, and program instructions, collectively stored in the set of one or more storage media, for causing a processor set to perform any combination of features of the foregoing methodology. Similar technical effects are obtained.

In another general approach, a CS includes a processor set, a set of one or more computer-readable storage media, and program instructions, collectively stored in the set of one or more storage media, for causing the processor set to perform any combination of features of the foregoing methodology. Similar technical effects are obtained.

In one general approach, a CIM includes generating a primary cryptographic recovery key, and generating an alternate cryptographic recovery key, where the alternate cryptographic recovery key is generated and stored in a cryptographic Hardware Security Module (HSM). The method further includes storing an encrypted fallback key in metadata associated with a data set, where the encrypted fallback key is an operational key encrypted by the primary cryptographic recovery key, storing a RKVP in the metadata, where the RKVP is associated with the primary cryptographic recovery key and is stored for the primary cryptographic recovery key. In response to a determination that the operational key is unavailable, the encrypted fallback key is retrieved to perform a data decryption operation, where retrieving the encrypted fallback key includes: determining whether an RKVP associated with a key label of a request for the data set matches the primary cryptographic recovery key. In response to a determination that the RKVP associated with the key label matches the primary cryptographic recovery key: the primary cryptographic recovery key is used to decrypt the encrypted fallback key, a current master key stored in the cryptographic HSM is used to encrypt the decrypted fallback key, a protected key to be used for encrypting and decrypting the data set is generated, and the master key encrypted fallback key is stored in a CKDS.

Technical effects of creating the keys described above (and particularly the fallback key) and thereafter having the fallback key available for retrieving in response to a determination that the operational key is unavailable include the mitigation of latency and processing consumption that is otherwise incurred in conventional data storage systems upon an operational key becoming unavailable. This also preserves user data that would otherwise be lost, as manual decryption is not feasible for recovering user data encrypted by the lost encryption key(s). More specifically, the processing and delays that are avoided as a result of enabling and using the fallback key described herein, may be broken down as follows. Recovery of the user data is made possible in seconds rather than such recovery being otherwise impossible to perform. Furthermore, backup key data sets do not need to be located, and therefore use of the fallback key described herein mitigates minutes of time that would otherwise be expended to locate such data sets. The at least minutes that would otherwise be used to search each backup key data set for the lost key (in an attempt to recover from a lost encryption key) is also avoided based on the fallback key being available. This has the technical effect of a reduction in latency and a reduction in processing overhead. At least minutes that would otherwise be incurred to determine whether backup key data sets have the same master key as the active key data set, and hours to load new resources to rotate the master key of the backup key data set to match the active key data set are also no longer incurred based on the technical effect of the techniques described herein for using a fallback key. The hours that would otherwise be incurred to extract a key from the backup key data set are also avoided, thereby further refining recovery from an unavailability of an operational key.

In one technical use case, a CIM includes generating a primary cryptographic recovery key, and generating an alternate cryptographic recovery key in a data storage system that is used to store customer data, e.g., a data set that remains encrypted when not being readily accessed by the customer and/or processed via the operations of the method. The alternate cryptographic recovery key is generated and stored in a cryptographic Hardware Security Module (HSM) of the data storage system. The method further includes storing an encrypted fallback key in metadata associated with the data set, where the encrypted fallback key is an operational key encrypted by the primary cryptographic recovery key, and storing a RKVP in the metadata, where the RKVP is associated with the primary cryptographic recovery key and is stored for the primary cryptographic recovery key. In response to a determination that the operational key is unavailable, the encrypted fallback key is retrieved to perform a data decryption operation.

Technical effects of creating the keys described above (and particularly the fallback key) and thereafter having the fallback key available for retrieving in response to a determination that the operational key is unavailable include the mitigation of latency and processing consumption that is otherwise incurred in conventional data storage systems upon an operational key becoming unavailable. This also preserves user data (customer data described above) that would otherwise be lost, as manual decryption is not feasible for recovering user data encrypted by the lost encryption key(s). This enhances customer trust of the data storage system as loss events are avoided.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as cryptographic key recovery code of block 150 for retrieving an encrypted fallback key from metadata to perform a data decryption operation in response to a determination that an operational key (that would otherwise be used to perform the data decryption operation if the alternate cryptographic recovery key were available) is unavailable. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As mentioned elsewhere above, a cryptographic key is information that is stored in a file, and when used, is proceeded by a cryptographic algorithm in order to encrypt and decrypt cryptographic data. The cryptographic key is usually in the form of a string of numbers or letters. Key lifecycle management refers to the creation and retirement of cryptographic keys. This is commonly referred to as "key rollover."

Cryptographic keys are a prerequisite to accessing encrypted data in the clear. Loss of an encryption key equals loss of any data protected by the key. With strategies like pervasive encryption and capabilities like data set level encryption, the impact of a lost encryption key would be widespread and catastrophic.

Encryption keys can be inadvertently or maliciously overwritten or deleted in key stores, or the key store itself can become corrupted. Additionally, when a backup copy of the key store is restored, there may be keys missing. In these cases, any associated encrypted data would be rendered unusable. Any case of encrypted data being rendered unusable is problematic for a number of reasons. For example, encrypted data being rendered unusable typically results in a loss of customer data, which results in a loss of customer satisfaction and trust in the infrastructure associated with the data being lost. Furthermore, encrypted data being rendered unusable results in a significant amount of computer processing and processing delay being incurred to process the loss of data, e.g., processing requests for the data before the encrypted data is determined to be unusable, processing associated with troubleshooting to determine whether the encrypted data is recoverable, processing associated with enabling data storage space claimed by the unusable encrypted data to be reclaimable, etc. More specifically, this incurred processing and delays may, in some cases, be broken down to the unusable data making it impossible to recover the data, at least minutes to locate backup key data sets, at least minutes to search each backup key data set for the lost key, at least minutes to determine if the backup key data sets have the same master key as the active key data set, hours to load new resources to rotate the master key of the backup key data set to match the active key data set, hours to extract the key from the backup key data set, and at least seconds to write the key to the active key data set.

In order to mitigate the additional processing load and loss of customer trust described above, techniques of approaches described herein cause an operational key (which in some deployments may be a source data set encryption (DSE) key) that acts as a source data encryption key to be encrypted by a recovery key and stored as a fallback key outside of a key store. This way, the fallback key is available and may be recovered even in situations in which the operational key becomes unusable or unavailable in the key store.

More specifically, the techniques described herein enable a mechanism by which a recovery key can be generated and maintained in a cryptographic hardware security module (HSM). Upon a data set being opened, a fallback key (which is the source DSE key encrypted by the recovery key) is stored in metadata of the data set. For any subsequent data set access in which the operational key is determined to be unusable or unavailable in the HSM, the operational key is recoverable by decrypting the fallback key stored in the metadata, where the fallback keys is decrypted using the recovery key.

A list of infrastructure terms used in the descriptions herein and their configuration definitions is provided below.

Key Officer: A trusted official that may be relied on to authenticate a trusted key encryption (TKE) for a TKE loading component.

TKE loading component: A component that is configured to load cryptographic recovery keys to a TKE workstation.

TKE workstation: A component that is configured to load cryptographic recovery keys portions into an alternate cryptographic recovery key register on a predetermined card (such as a cryptographic express adapter by IBM, or the like)

Cryptographic express adapter: An HSM used to generate and process secure keys, which can maintain master keys and can include recovery key registers to secure and manage primary and alternate recovery keys.

Hardware security module (HSM): A physical computing device that acts as a cryptographic key store by securing and managing cryptographic keys for critical functions such as encryption and decryption.

Cryptographic recovery keys: 256-bit Advanced Encryption Standard (AES) keys that are persistently stored in recovery key registers on a cryptographic express adapter and must be loaded using a TKE workstation.

Primary cryptographic recovery keys: Cryptographic keys used to create and recover fallback keys.

Alternate cryptographic recovery keys: Cryptographic keys used to recover cryptographic fallback keys that are encrypted with a cryptographic recovery key other than the current primary cryptographic recovery key. An alternate cryptographic recovery key is not used to create new fallback keys.

Fallback cryptographic keys: Cryptographic keys that are created by exporting master key-encrypted data encryption keys (DEK) under the primary cryptographic recovery key. Fallback cryptographic keys reside with data being encrypted (e.g. data set encryption cell) and can be recovered to secure cryptographic keys by importing them under the local cryptographic master key.

Operational cryptographic key: A type of operational cryptographic key generated with enhanced security to be used specifically for encrypting and decrypting a dataset. In some specific approaches, the is specifically used for an associated logical partition (LPAR) for encrypting and decrypting a data set processed within the LPAR.

Protected cryptographic key: A type of operational cryptographic key generated with enhanced security to be used specifically for encrypting and decrypting a dataset. In some specific approaches, the is specifically used for an associated logical partition (LPAR) for encrypting and decrypting a data set processed within the LPAR.

Data management subsystem (DMS): Software configured to create and manage a data set.

Cryptographic hardware security module (HSM): A physical device that secures cryptographic keys and may be used to perform encryption and decryption processes using the cryptographic keys.

Recovery Key Verification Pattern (RKVP): A predetermined pattern (such as a token) that that acts as a thumbprint or index of an associated cryptographic recovery key. This way an HSM is able to determine which cryptographic recovery key to use where multiple cryptographic recovery keys are used for managing one or more data sets.

Data set encryption cell: A dedicated logical and/or physical portion of memory that stores metadata in which information including a key label, a cryptographic fallback key, and a RKVP may be stored.

Key label: A pointer to an associated key.

Data set: Data (such as client data) that is stored on a storage device and secured by being encrypted.

System authorization facility (SAF): An interface (such as an application protocol interface (API)) that enables programs to use system authorization services to control access to resources, such as data sets.

System authorization facility (SAF) database: A database that includes data sets associated with the SAF.

Cryptographic Key Data Set (CKDS): A data set that contains encryption keys protected by use of a master key.

Integrated cryptographic service facility (ICSF): A component that provides secure cryptographic services, including an ability to perform encryption and decryption operations.

CP Assist for Cryptographic Functions: An algorithm for encrypting and decrypting a data set using a protected key returned to a component running the algorithm.

With respect to infrastructure terms above, the techniques described herein involve a master key being loaded onto a crypto express adapter which can encrypt operational keys that are stored in the key store as secure keys. With this solution, the crypto express adapter is enhanced to support a recovery key. Crypto middleware (i.e. ICSF) would invoke a new function on the Crypto Express adapter to encrypt an operational key with the Recovery Key, thus creating a cryptographic fallback key. The cryptographic fallback key is returned to the caller to be stored outside of the key store as metadata for the encrypted data. When the caller invokes ICSF and is unable to retrieve a valid cryptographic operational key from the key store, the cryptographic original key can be recovered from the cryptographic fallback key using the cryptographic recovery key on the crypto express adapter. In addition, these techniques describes how to rotate the cryptographic recovery key.

Now referring to FIG. 2A, a flowchart of a method 200 is shown according to one approach. The method 200 may be performed in accordance with the present invention in any of the environments depicted in FIGS. 1-5, among others, in various approaches. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various approaches, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may be performed in any type of data storage environment in which cryptography keys are used to secure and protect data sets. For context, method 200 includes a relatively high level descriptions of establishing and thereafter retrieving an encrypted fallback key to perform a data decryption operation in response to a determination that an operational key is unavailable. Other descriptions herein detail infrastructure driven uses of the method of FIG. 2A, e.g., see flowcharts of FIGS. 2B-2E.

With continued reference to FIG. 2A, operation 202 includes generating a primary cryptographic recovery key. The primary cryptographic recovery key may be a type of cryptographic key that would become apparent to one of ordinary skill in the art after reading the descriptions herein. Furthermore, the primary cryptographic recovery key may include any predetermined number of bits. In some approaches the primary cryptographic recovery key is generated by a cryptographic key generating engine in response to a determination that a data set is scheduled to be stored and/or is stored to a predetermined storage module. In some preferred approaches, the primary cryptographic recovery key is stored in a cryptographic HSM.

An alternate cryptographic recovery key is, in some approaches, generated, e.g., see operation 204. In some approaches, the alternate cryptographic recovery key is a copy of the primary cryptographic recovery key. The alternate cryptographic recovery key may, in some approaches, be generated and stored in the cryptographic HSM.

Method 200 preferably includes generating an encrypted fallback key. In some approaches, the encrypted fallback key is an operational key in that the fallback key is configured to be actively used within a data storage system to encrypt and decrypt data sets therein, e.g., the encrypted fallback key once decrypted may be used to be used as a data set encryption key for encrypting and decrypting the data set. In some approaches, the operational key is a data set encryption (DSE) key by IBM or the like. Furthermore, the encrypted fallback key is, in some preferred approaches, encrypted by the primary cryptographic recovery key. Once encrypted, the encrypted fallback key is stored in metadata associated with a data set, e.g., see operation 206. More specifically, the encrypted fallback key may be stored in a data set encryption cell (also referred to herein as "metadata"). Each data set encryption cell may contain information that details an association of the data set encryption cell with an encrypted data set, e.g., thereby acting as metadata of the encrypted data set. In other words, in some approaches, a plurality of data set encryption cells may be managed and updated according to the techniques described herein. In addition to, or alternative to, the encrypted fallback key, the data set encryption cell may include a data set encryption key and/or a data set encryption key label that is a label of a cryptographic data set encryption key that is used to encrypt the encrypted data set.

The data set encryption cell may additionally and/or alternatively be caused to store an RKVP associated with a current cryptographic recovery key, e.g., see operation 208. In some other approaches, the current cryptographic recovery key is the primary cryptographic recovery key, while in some other approaches, the current cryptographic recovery key is the alternate cryptographic recovery key.

As detailed elsewhere above, in some cases, an operational key may become unavailable. For example, the operational key may be maliciously or inadvertently overwritten. In order to prevent incurrence of the processing load and loss of time that such a loss would otherwise result in an operational key becoming unavailable, method 200 includes ongoingly determining whether the operational key is unavailable. In some approaches, the operational key may be determined to be unavailable in response to receiving a notification that the operational key has been inadvertently overwritten. In some other approaches, the operational key may be determined to be unavailable in response to a determination that an attempt to access the data set has failed. In yet some other approaches, the operational key may be determined to be unavailable in response to a determination that an attempt to access the data set has failed and predetermined recovery actions performed in an attempt to acquire the operational key to access the data set have also failed.

In response to a determination that the operational key is available, e.g., as illustrated by the "NO" logical path of decision 210, monitoring for a loss of access to the operational key optionally continues. In contrast, in response to a determination that the operational key is unavailable, e.g., as illustrated by the "YES" logical path of decision 210, the encrypted fallback key is retrieved to perform a data decryption operation, e.g., see operation 212. It should be noted that the data decryption operation may include decrypting the data set in response to the data set being requested, e.g., such as by a user device. Furthermore, it may be noted that, the data decryption operation is originally intended for being performed by the operational key in that the operational key would have other otherwise been used to perform the data decryption operation if available.

Technical effects of creating the keys described above (and particularly the fallback key) and thereafter having the fallback key available for retrieving in response to a determination that the operational key is unavailable include the mitigation of latency and processing consumption that is otherwise incurred in conventional data storage systems upon an operational key becoming unavailable. This also preserves user data that would otherwise be lost, as manual decryption is not feasible for recovering user data encrypted by the lost encryption key(s). More specifically, the processing and delays that are avoided as a result of enabling and using the fallback key described herein, may be broken down as follows. Recovery of the user data is made possible in seconds rather than such recovery being otherwise impossible to perform. Furthermore, backup key data sets do not need to be located, and therefore use of the fallback key described herein mitigates minutes of time that would otherwise be expended to locate such data sets. The at least minutes that would otherwise be used to search each backup key data set for the lost key (in an attempt to recover from a lost encryption key) is also avoided based on the fallback key being available. This has the technical effect of a reduction in latency and a reduction in processing overhead. At least minutes that would otherwise be incurred to determine whether backup key data sets have the same master key as the active key data set, and hours to load new resources to rotate the master key of the backup key data set to match the active key data set are also no longer incurred based on the technical effect of the techniques described herein for using a fallback key. The hours that would otherwise be incurred to extract a key from the backup key data set are also avoided, thereby further refining recovery from an unavailability of an operational key.

Referring now to FIGS. 2B-2E, flowcharts depicting examples of infrastructure driven uses of the method of FIG. 2A, is shown in accordance with several approaches of the present invention. The infrastructure illustrated in FIGS.

2B-2E include various components detailed in the list of terms described elsewhere above. For example, in some approaches, the infrastructure illustrated in FIGS. 2B-2E includes a CKDS that is in communication with an ICSF of an API 222 of a system 224. The ICSF may, in some approaches, be in further communication with a physical cryptographical card that a key register may be stored on, e.g., see Crypto express.

The infrastructure illustrated in FIGS. 2B-2E may, additionally and/or alternatively include a SAF database, which may be controlled by a SAF, and a hardware cryptographic engine such as CP Assist for Cryptographic Functions (CPACF) by IBM (or the like) that is in communication with a DMS of the API. The DMS may, in some approaches, be configured to cause and/or be instructed to cause information to be written to a data set stored on a storage module, e.g., see data sets, and/or associated metadata thereof, e.g., see data set encryption cell which includes a key label, an encrypted fallback key and a RKVP. This infrastructure may be instructed and/or these operations may be performed by a component, e.g., such as a processing circuit, that is configured to perform method detailed in FIGS. 2B-2E. In other words, in some approaches, operation performed by infrastructure within FIGS. 2B-2E may be performed based on an instruction being issued to the associated infrastructure.

It should be noted that some operations performed within FIGS. 2B-2E refer to both an operational cryptographic key and a protected cryptographic key. Although the protected cryptographic key may be used in LPAR based infrastructure, in some other approaches, an operational cryptographic key that is configured to encrypting and decrypting a non-LPAR based data set may be used in place of the protected cryptographic key. In preferred approaches, for the processing referenced in this disclosure, a protected cryptographic key is always used for data set encryption and decryption operations.

Figure 2B:
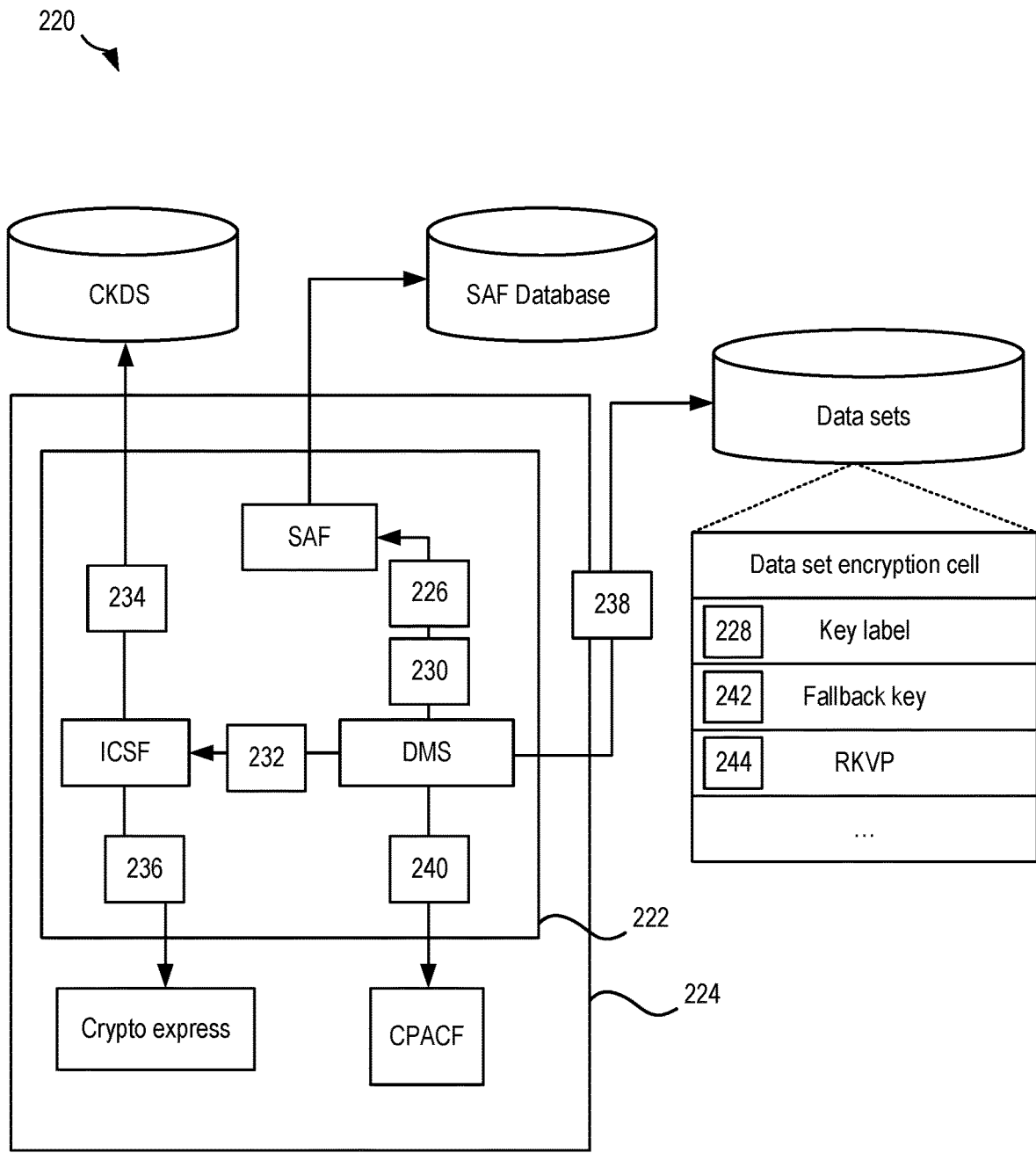
FIG. 2B is a flowchart depicting an example of an infrastructure driven use of the method of FIG. 2A, in accordance with one approach of the present invention.

With reference first to FIG. 2B, a flowchart of a method 220 is shown according to one approach. The method 220 may be performed in accordance with the present invention in any of the environments depicted in FIGS. 1-5, among others, in various approaches. Of course, more or fewer operations than those specifically described in FIG. 2B may be included in method 220, as would be understood by one of skill in the art upon reading the present descriptions.

Each of the steps of the method 220 may be performed by any suitable component of the operating environment. For example, in various approaches, the method 220 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 220. Illustrative processors include, but are not limited to, a central processing unit (CPU), an application specific integrated circuit (ASIC), a field programmable gate array (FPGA), etc., combinations thereof, or any other suitable computing device known in the art.

FIG. 2B illustrates an example of an infrastructure driven uses of the method of FIG. 2A that details data set creation operations. For example, a storage administrator may create a data set which invokes the DMS. The DMS may invoke, or alternatively be instructed to invoke, the SAF to determine whether a data encryption key label is specified for the data set. For context, a data encryption key label is ensured to be specified for the data set in order to organize and determine which encryption key(s) are to be used to decrypt and encrypt the data set thereafter, e.g., as will be described in further use case examples and operations described below. In response to a determination that a data encryption key label is specified for the data set, the key label is stored in the metadata, e.g., the DMS is instructed to store the key label in the data set encryption cell (see operations 226 and 228).

In operation 230, a data owner requests the opening of opening of a data set, e.g., creation of the data set. In response to a determination that such a request has been received and/or such an action has been taken, the DMS is invoked. A check is caused to be performed in order to check authorization to a key label associated with the request for the data set. Note that this key label may be stored in the CKDS. Once invoked, the DMS then invokes (e.g., in some approaches may be instructed to invoke) the SAF to check authorization to the key label, e.g., see operation 232. In some approaches, the DMS invokes an ICSF with the key label.

Operation 234 includes causing the ICSF to locate the key label in a key store, i.e., the CKDS. Furthermore, the ICSF may be caused to invoke an HSM (such as a crypto express adapter in some approaches), and firmware to generate two keys, e.g., see operation 236. These keys are, in some approaches, preferably returned to the DMS. A first of these keys includes an operational key to be actively used for the encryption and decryption of the data set. With respect to the infrastructure of FIG. 2B, this encryption and decryption of the data set may be performed using a hardware crypto engine, such as a CPACF. A second of the keys that are generated include a fallback key, that is an operational key encrypted by a recovery key (and more specifically encrypted by a primary recovery key), which can later be used to recover the operational key if it becomes unavailable in the HSM on a subsequent data set open (an attempt to access the data set based on a request for the data set). A recovery key verification pattern (RKVP) associated with a current recovery key used in the system 224 is stored in metadata. In some approaches, this RKVP is associated with the alternate cryptographic recovery key. In some other approaches, the RKVP is associated with the primary cryptographic recovery key and is stored for the primary cryptographic recovery key. For example, the RKVP may be used (by the HSM) to be able to determine which cryptographic recovery key to use where multiple cryptographic recovery keys are used for managing one or more data sets.

The RKVP and the fallback key are stored in the data set encryption cell. For example, operation 238 includes causing the DMS to store the fallback key, e.g., stored in operation 242, and the RKVP, e.g., stored in operation 244, in the data set encryption cell. Operation 240 includes the DMS invoking, e.g., being instructed to invoke, the CPACF to encrypt the data set using the operational key. This way, the data set remains in a secured, e.g., encrypted, state while authorized reads are not actively being performed on the data set.

As mentioned elsewhere above, technical effects of creating the keys described above (and particularly the fallback key) and thereafter having the fallback key available for retrieving in response to a determination that the operational key is unavailable include the mitigation of latency and processing consumption that is otherwise incurred in conventional data storage systems upon an operational key becoming unavailable. This also preserves user data that would otherwise be lost, as manual decryption is not feasible for recovering user data encrypted by the lost encryption key(s). More specifically, the processing and delays that are avoided as a result of enabling and using the fallback key described herein, may be broken down as follows. Recovery of the user data is made possible in seconds rather than such recovery being otherwise impossible to perform. Furthermore, backup key data sets do not need to be located, and therefore use of the fallback key described herein mitigates minutes of time that would otherwise be expended to locate such data sets. The at least minutes that would otherwise be used to search each backup key data set for the lost key (in an attempt to recover from a lost encryption key) is also avoided based on the fallback key being available. This has the technical effect of a reduction in latency and a reduction in processing overhead. At least minutes that would otherwise be incurred to determine whether backup key data sets have the same master key as the active key data set, and hours to load new resources to rotate the master key of the backup key data set to match the active key data set are also no longer incurred based on the technical effect of the techniques described herein for using a fallback key. The hours that would otherwise be incurred to extract a key from the backup key data set are also avoided, thereby further refining recovery from an unavailability of an operational key.

Figure 2C:
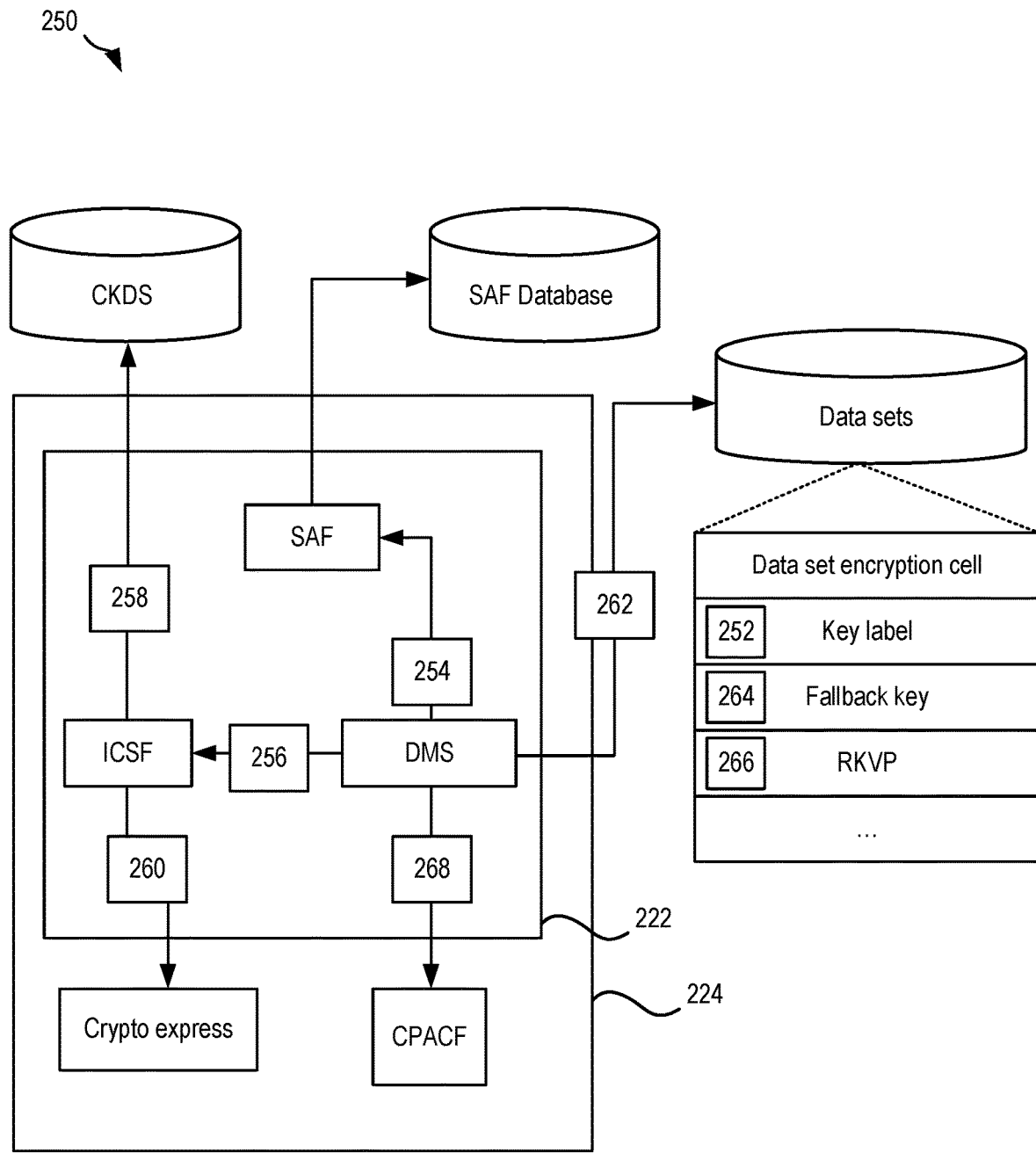
FIG. 2C is a flowchart depicting an example of an infrastructure driven use of the method of FIG. 2A, in accordance with one approach of the present invention.

Referring now to FIG. 2C, a flowchart is depicted that includes techniques for opening a data set after creation of the fallback key and furthermore maintaining the fallback key. More specifically, the operations of the flowchart of FIG. 2C detail the verification of an alternate cryptographic recovery key (of the HSM) using a RKVP in the metadata of a data set during a subsequent access to the data set (subsequent to the fallback key being added to the metadata of the data set) to validate the recovery key stored in the HSM.

In FIG. 2C, a flowchart of a method 250 is shown according to one approach. The method 250 may be performed in accordance with the present invention in any of the environments depicted in FIGS. 1-5, among others, in various approaches. Of course, more or fewer operations than those specifically described in FIG. 2C may be included in method 250, as would be understood by one of skill in the art upon reading the present descriptions.

Each of the steps of the method 250 may be performed by any suitable component of the operating environment. For example, in various approaches, the method 250 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 250. Illustrative processors include, but are not limited to, a central processing unit (CPU), an application specific integrated circuit (ASIC), a field programmable gate array (FPGA), etc., combinations thereof, or any other suitable computing device known in the art.

It should be noted that the operations of method 250 may be performed with respect to the data set mentioned in other methods described herein, e.g., see methods 200 and method 220. In other words, the data set may be assumed to be encrypted by the operational key described elsewhere above. At any time, a request for the data set may be received, e.g., such as from a client device that is being used by an owner of the data set. In some preferred approaches, in response to receiving the request for the data set, a predetermined maintenance process may be performed, as will now be described below. In some approaches, in response to a determination that such a request is received, the DMS may be invoked, e.g., see operation 254. The DMS may invoke or be caused to invoke (instructed to invoke) SAF to check authorization to the key label, e.g., see operation 252.

The DMS invokes or is caused to invoke an ICSF with the key label and RKVP, e.g., see operation 256. ICSF is caused to locate the key label in a key store, i.e. a CKDS, e.g., see operation 258.

The predetermined maintenance process, in some preferred approaches, includes causing, e.g., instructing, the cryptographic HSM to generate and return a protected key to be actively used for encryption and decryption of the data set, e.g., see operation 260. This encryption and decryption of the data set may occur by using a hardware crypto engine such as CP Assist for Cryptographic Functions CPACF by IBM (or the like), in some approaches. Furthermore, the ICSF invokes the cryptographic HSM and firmware to generate and return a protected key to be actively used for the encryption and decryption of the data set using a hardware crypto engine, such as CPACF.

Operation 260 of the predetermined maintenance process preferably further includes verifying whether the RKVP matches the current Recovery Key. For example, a determination may be made as to whether an RKVP associated with a key label of the request for the data set matches the primary cryptographic recovery key. In response to a determination that the RKVP associated with a key label does not match the primary cryptographic recovery key, a new fallback key is generated. In some approaches, the new fallback key is encrypted by the primary cryptographic recovery key. In other words, in some approaches, in response to a determination that a match does not exist, a new fallback key is generated, encrypted by the current recovery key, and the new RKVP is returned to the DMS.

The predetermined maintenance process preferably further includes causing the RKVP associated with a key label to be compared with the RKVP stored in the metadata. This comparison may be performed, as part of the maintenance process to ensure that the request for the data set is both authorized (a match exists) and the correct data set is being opened. With respect to the infrastructure of FIG. 2C, 5 the DMS preferably compares, or is caused to compare, the returned RKVP with the RKVP in the encryption, e.g., see operation 262 operation 264 and operation 266. In response to a determination, from results of the comparison, that the RKVP associated with a key label does not match the RKVP stored in the metadata, the new fallback key and the RKVP associated with a key label are caused to be stored in the metadata. More specifically, if a match does not exist, the DMS is caused to store the returned fallback key and RKVP in the data set encryption cell. This storage of the new fallback key and the RKVP associated with a key label in metadata ensures that the mismatch is correct for a subsequent opening of the data set.

Operation 268 includes the DMS invoking (being instructed to invoke) CPACF to encrypt, e.g., write operation, or decrypt, e.g., read operation, the data set using the returned protected key.

A technical effect of performing the predetermined maintenance process to maintain the fallback key within infrastructure includes preventing the occurrence of an RKVP and a recovery key not matching from delaying recovery procedures from being performed in the event that an encryption key is lost, and furthermore, mitigates delay (that would otherwise occur based on the mismatch existing) from occurring in a subsequent request for opening the data set.

Figure 2D:
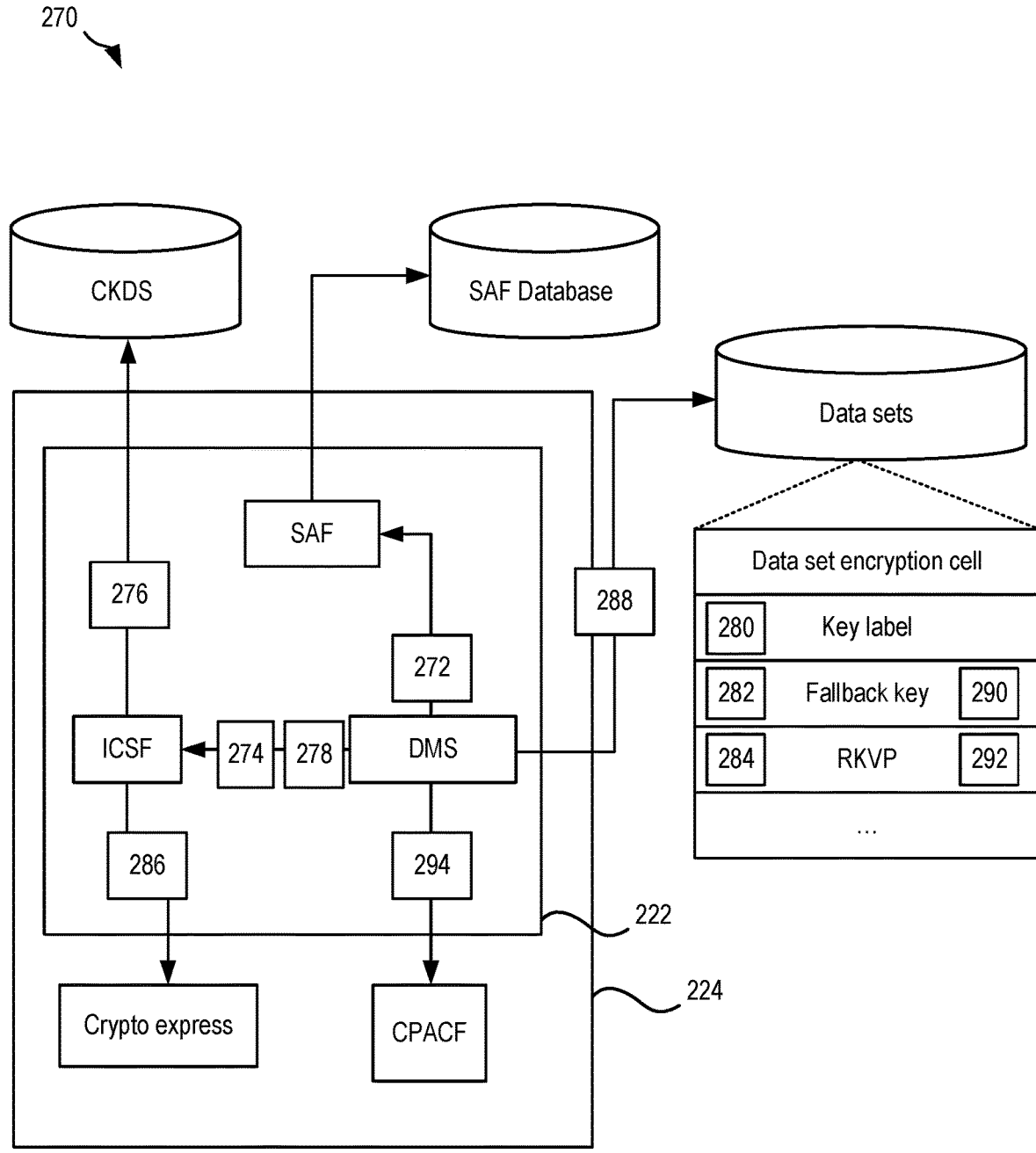
FIG. 2D is a flowchart depicting an example of an infrastructure driven use of the method of FIG. 2A, in accordance with one approach of the present invention.

Referring now to FIG. 2D, a flowchart is depicted that includes techniques for recovering a key from a fallback key. More specifically, the operations of the flowchart of FIG. 2D detail restoring an operational key (DSE key) using the fallback key and storing the restored DSE key to the key store, in response to detecting that the DSE key is missing from a key store.

In FIG. 2D, a flowchart of a method 270 is shown according to one approach. The method 270 may be performed in accordance with the present invention in any of the environments depicted in FIGS. 1-5, among others, in various approaches. Of course, more or fewer operations than those specifically described in FIG. 2D may be included in method 270, as would be understood by one of skill in the art upon reading the present descriptions.

Each of the steps of the method 270 may be performed by any suitable component of the operating environment. For example, in various approaches, the method 270 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 270. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that, in some approaches, operations of method 270 may be performed in response to a determination that a key is unavailable. For example, the fallback key may be used in response to a determination that the operational key is unavailable. This unavailability may, in some approaches, be based on a key label for the alternate cryptographic recovery key being deleted. This unavailability may, in some approaches, be determined upon attempting to open a data set. In some other approaches, this unavailability may be determined upon performing a precautionary check to ensure that the RKVP matches the primary cryptographic recovery key.

In some approaches, method 270 includes determining that an owner of the data set attempts and/or requests to open an existing data set. In response thereto, the DMS may be invoked, e.g., see operation 272. The DMS, in some approaches, invokes the SAF to check authorization to the key label.

Furthermore, the DMS may invoke the ICSF with the key label and the RKVP, e.g., see operation 274. The ICSF may be unable to locate the key label in the key store (in the CKDS) and therefore, in such an approach, may return a failure, e.g., see operation 276.

In response to the failure, the encrypted fallback key is retrieved, For example the DMS may retrieve or be instructed to retrieve the fallback key from the data set encryption cell and ICSF may be invoked with the key label, the RKVP and the fallback key, e.g., see operation 278, operation 280, operation 282 and operation 284.

The process of retrieving the encrypted fallback key may further include causing the ICSF to invoke the HSM and firmware to determine whether an RKVP associated with a key label of a request for the data set matches the primary cryptographic recovery key, e.g., see operation 286. In some approaches, this determination includes verifying that the RKVP matches the Primary Recovery Key. In other words, a verification is performed to ensure that the instance specific recovery key is being acquired. In response to a determination that the RKVP associated with the key label matches the primary cryptographic recovery key, method 270 includes using the primary cryptographic recovery key to decrypt the encrypted fallback key, and using a current master key stored in the cryptographic HSM to encrypt the decrypted fallback key. Note that the master key may be defined as a key that is used to label operational keys in the cryptographic HSM, in some approaches. In other words, the fallback key is decrypted from under the primary recovery key, and the resulting key is encrypted with the current master key.

Operation 286 furthermore includes generating a protected key to be used for encrypting and decrypting the data set, in some approaches. In other words, in response to the determination that the RKVP associated with the key label matches the primary cryptographic recovery key, a protected key is generated and returned to be actively used for the encryption and decryption of the data set using a hardware crypto engine, such as the CPACF.

The master key encrypted fallback key is stored in the CKDS. Furthermore, in some approaches, both the protected key and the RKVP associated with the key label are returned to an API of a system that manages use of the fallback key and the data set. For example, with respect to an infrastructure of method 270, the ICSF stores the MK-encrypted key in the CKDS and returns the protected key and RKVP to the DMS.

The CIM of claim 2, comprising: determining whether the RKVP associated with the key label matches the RKVP stored in the metadata; and in response to a determination that the RKVP associated with the key label does not match the RKVP stored in the metadata, storing the master key encrypted fallback key and the RKVP associated with the key label to the metadata (thereby effectively replacing the RKVP stored in the metadata with the RKVP associated with the key label).

The returned RKVP may be compared with the RKVP in the metadata, e.g., see operation 288, operation 290 and operation 292. More specifically, in some approaches, the DMS compares the returned RKVP with the RKVP in the encryption cell. In response to a determination that a match does not exist, the DMS stores the returned fallback key and RKVP in the metadata, e.g., the data set encryption cell.

In operation 294, the DMS invokes CPACF to encrypt, e.g., write operation, or decrypt, e.g., read operation, the data set using the returned protected key.

Technical effects of retrieving and using the fallback key (as described in method 270 above) include the mitigation of latency and processing consumption that is otherwise incurred in conventional data storage systems. These technical effects also include the preservation of user data that would otherwise be lost, as manual decryption is not feasible for recovering user data encrypted by the lost encryption key(s).

Figure 2E:
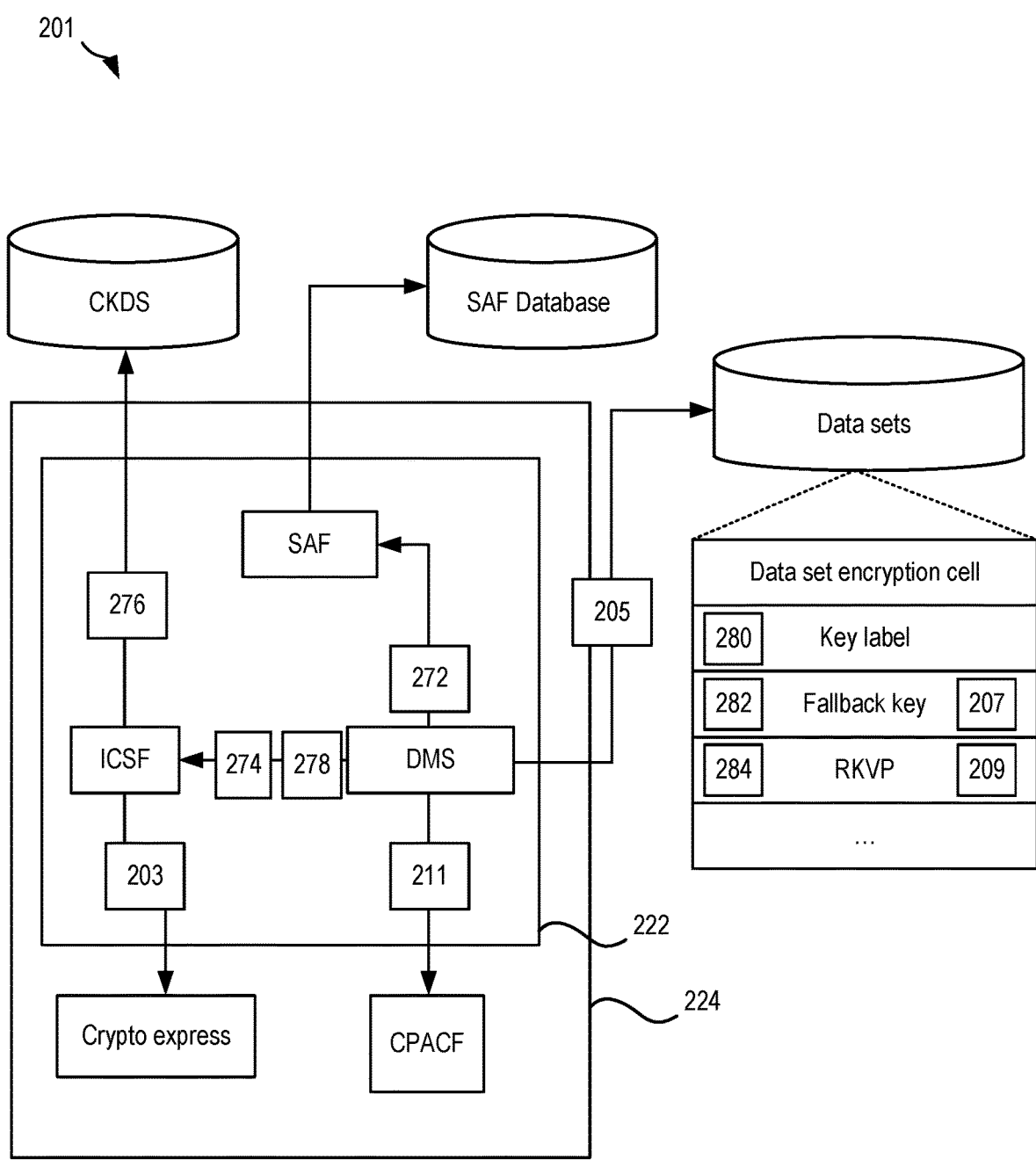
FIG. 2E is a flowchart depicting an example of an infrastructure driven use of the method of FIG. 2A, in accordance with one approach of the present invention.

Referring now to FIG. 2E, a flowchart is depicted that includes techniques for performing key recovery from a fallback key (using the alternate recovery key). More specifically, the operations of the flowchart of FIG. 2E detail that in response to detecting a mismatch of the RKVP and the alternate HSM recovery key, a new fallback key is generated from the HSM, and the new fallback key is stored in the metadata of the data set. In other words, on detection of a mismatch of the RKVP from data set metadata and the recovery key in the HSM, the generation of a new fallback key from the HSM is requested which is then stored with the new RKVP as part of the data set metadata.

In FIG. 2E, a flowchart of a method 201 is shown according to one approach. The method 201 may be performed in accordance with the present invention in any of the environments depicted in FIGS. 1-5, among others, in various approaches. Of course, more or fewer operations than those specifically described in FIG. 2E may be included in method 201, as would be understood by one of skill in the art upon reading the present descriptions.

Each of the steps of the method 201 may be performed by any suitable component of the operating environment. For example, in various approaches, the method 201 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 201. Illustrative processors include, but are not limited to, a central processing unit (CPU), an application specific integrated circuit (ASIC), a field programmable gate array (FPGA), etc., combinations thereof, or any other suitable computing device known in the art.

In some approaches, one or more of the operations of method 201 match one or more of the operations of method 270. For example, it may be noted that method 201 includes operation 272, operation 274, operation 276, operation 278, operation 280, operation 282 and operation 284. Accordingly, one or more of the operations described in method 270 may be performed in method 201.

Method 201 further includes ICSF invoking and/or being instructed to invoke the HSM and firmware to determine whether an RKVP associated with a key label of a request for the data set matches the primary cryptographic recovery key, e.g., see operation 203. In response to a determination that the RKVP associated with the key label does not match the primary cryptographic recovery key, a determination is made as to whether the RKVP associated with the key label matches the alternate cryptographic recovery key. In response to a determination that the RKVP associated with the key label does not match the alternate cryptographic recovery key, a failure is returned, e.g., to a device from which request for the data set is received.

In contrast, a match may be determined. For example, in response to a determination that the RKVP associated with the key label matches the alternate cryptographic recovery key, a predetermined recover process may be performed. The predetermined recover process, in some approaches, includes using the alternate cryptographic recovery key to decrypt the encrypted fallback key and encrypting the decrypted encrypted fallback key with a current master key stored in the cryptographic HSM. In other words, in response to such a determination, fallback key is decrypted from under the alternate recovery key and the resulting key is encrypted with the current master key.

The predetermined recover process, in some approaches, also includes encrypting the decrypted fallback key with the primary cryptographic recovery key and returning the primary cryptographic recovery key encrypted fallback key (the newly encrypted fallback key) and the RKVP associated with the key label to the device, e.g., the caller. A protected key may be generated to be actively used for encryption and decryption of the data set, e.g., where the encryption and decryption may be performed using a hardware crypto engine such as CPACF. The master key encrypted fallback key and the RKVP associated with the key label is stored in a CKDS and the protected key and RKVP associated with the key label are returned to the DMS. In other words, in some approaches, the ICSF stores the MK-encrypted key in the CKDS and returns the protected key and RKVP to the DMS.

The predetermined recover process may, in some approaches, include determining (by comparing) whether the RKVP associated with the key label matches the RKVP stored in the metadata, e.g., see operation 205, operation 207 and operation 209. In response to a determination that the RKVP associated with the key label does not match the RKVP stored in the metadata, the primary cryptographic recovery key encrypted fallback key and the RKVP associated with the key label are caused (by instructing the DMS) to be stored in the metadata. In some approaches, in response to a determination that the DMS receives an error from the ICSF, it fails the open operation. Otherwise, the DMS compares the returned RKVP with the RKVP in the encryption cell. If it does not match, the DMS stores the returned fallback key and RKVP in the data set encryption cell.

The DMS may, in some approaches, invoke CPACF to encrypt, e.g., write operation, or decrypt, e.g., read operation, the data set using the returned protected key, e.g., see operation 211.

Technical effects of retrieving the fallback key for performing a recovery include the mitigation of latency and processing consumption that is otherwise incurred in conventional data storage systems. These technical effects also include the preservation of user data that would otherwise be lost, as manual decryption is not feasible for recovering user data encrypted by the lost encryption key(s).

Figure 3:
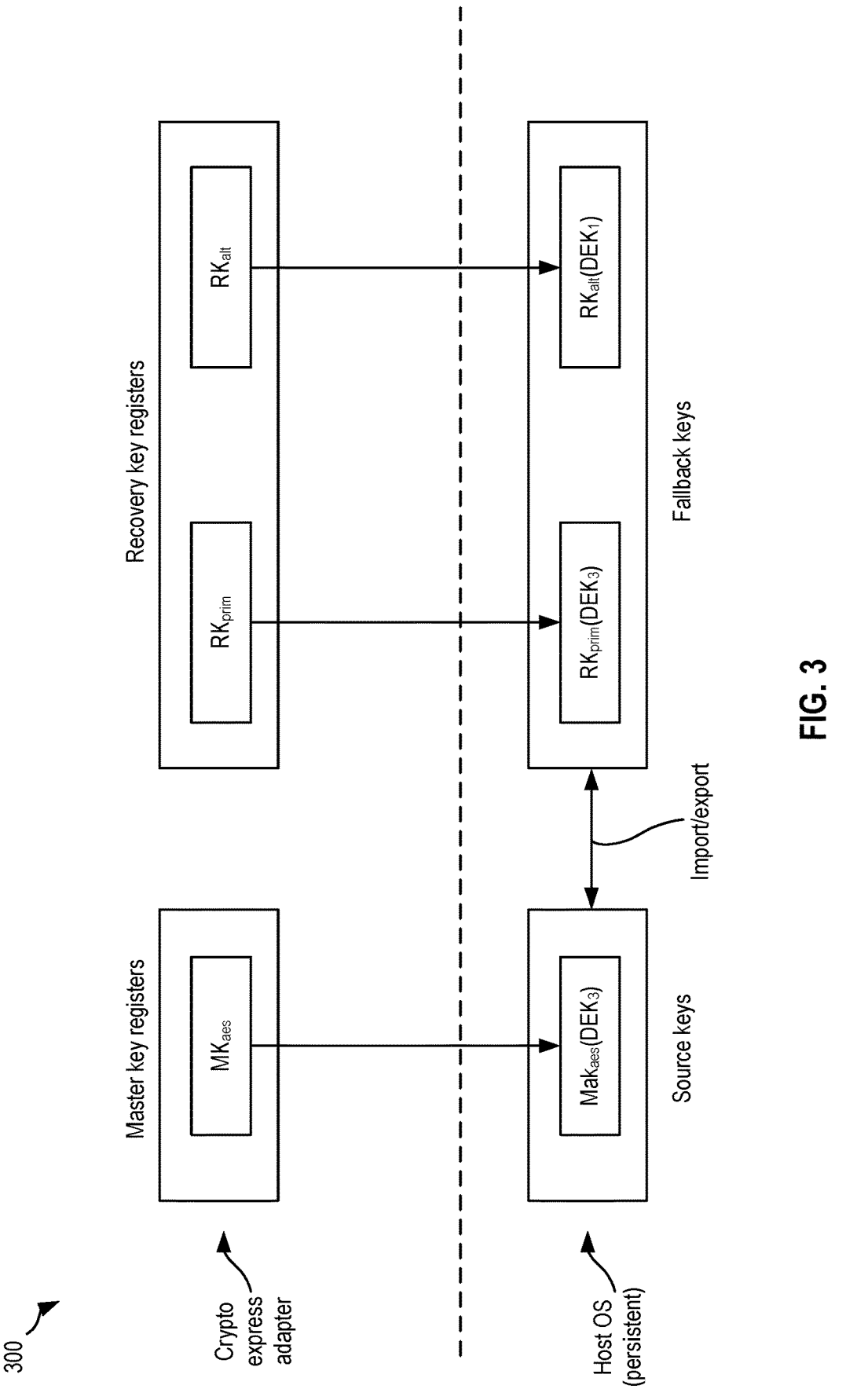
FIG. 3 depicts a key hierarchy, in accordance with one approach of the present invention.

FIG. 3 depicts a key hierarchy 300, in accordance with one approach. As an option, the present key hierarchy 300 may be implemented in conjunction with features from any other approach listed herein, such as those described with reference to the other FIGS. Of course, however, such key hierarchy 300 and others presented herein may be used in various applications and/or in permutations which may or may not be specifically described in the illustrative approaches listed herein. Further, the key hierarchy 300 presented herein may be used in any desired environment.

According to ISO 11568, the key hierarchy 300 may be defined as a conceptual structure in which the confidentiality of certain keys is dependent upon the confidentiality of other keys. Recovery keys are considered top-level keys. For example, in some approaches, the recovery keys are, in some approaches, 256-bit AES keys that are persistently stored in recovery key registers on a crypto Express adapter and must be loaded using a TKE workstation. In contrast, primary recovery keys may be used to create and recover fallback keys, in some approaches. Alternate recovery keys are used to recover fallback keys that are encrypted with a recovery key other than the current, primary recovery key. An alternate recovery key is not used to create new fallback keys.

Fallback keys are created by exporting master key-encrypted data encryption keys (DEK) under the primary recovery key. Fallback keys may reside with data being encrypted (e.g. data set encryption cell) and can be recovered to secure keys by importing them under the local master key.

Figure 4A:
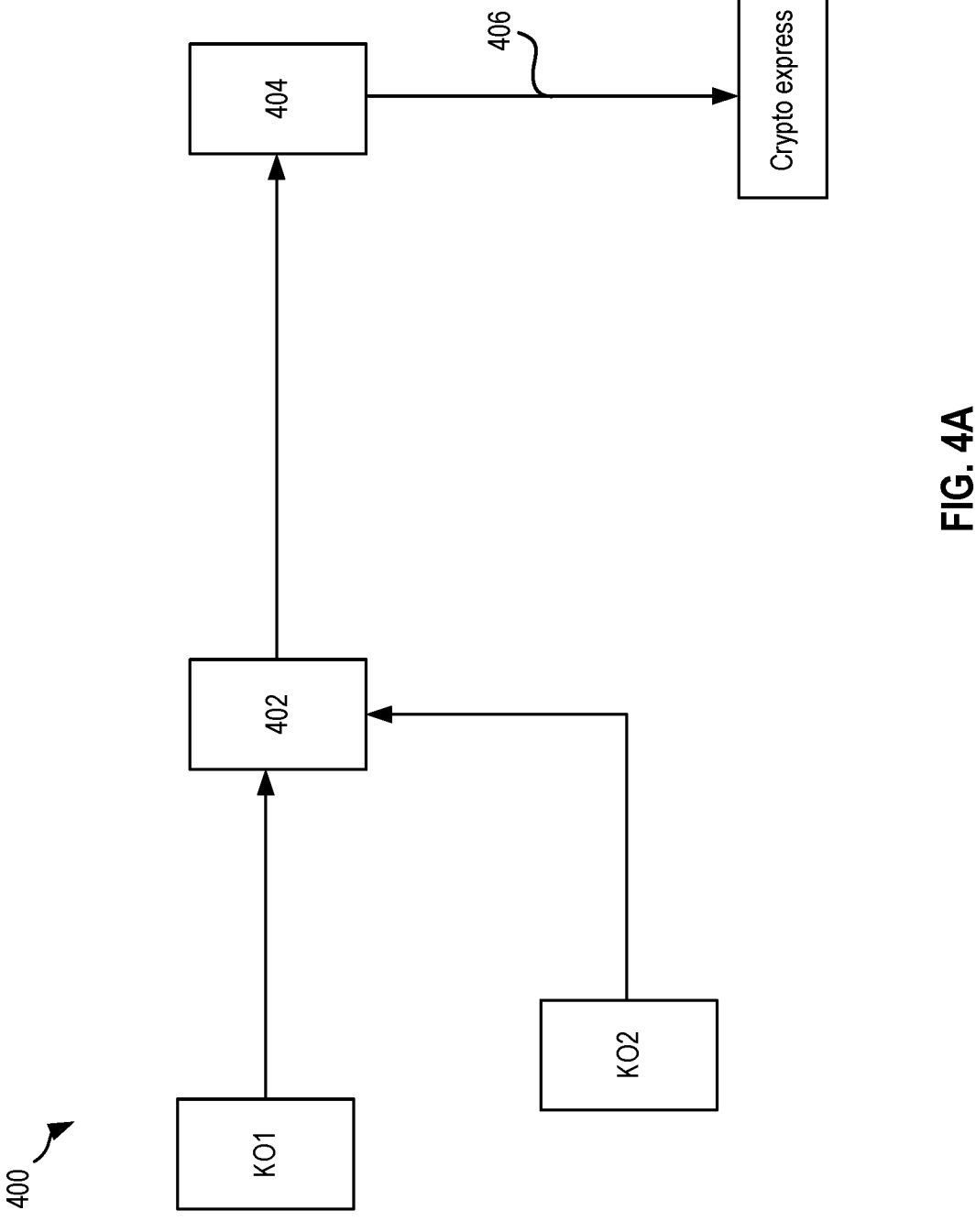
FIG. 4A depicts a load flowchart, in accordance with one approach of the present invention.
Figure 4B:
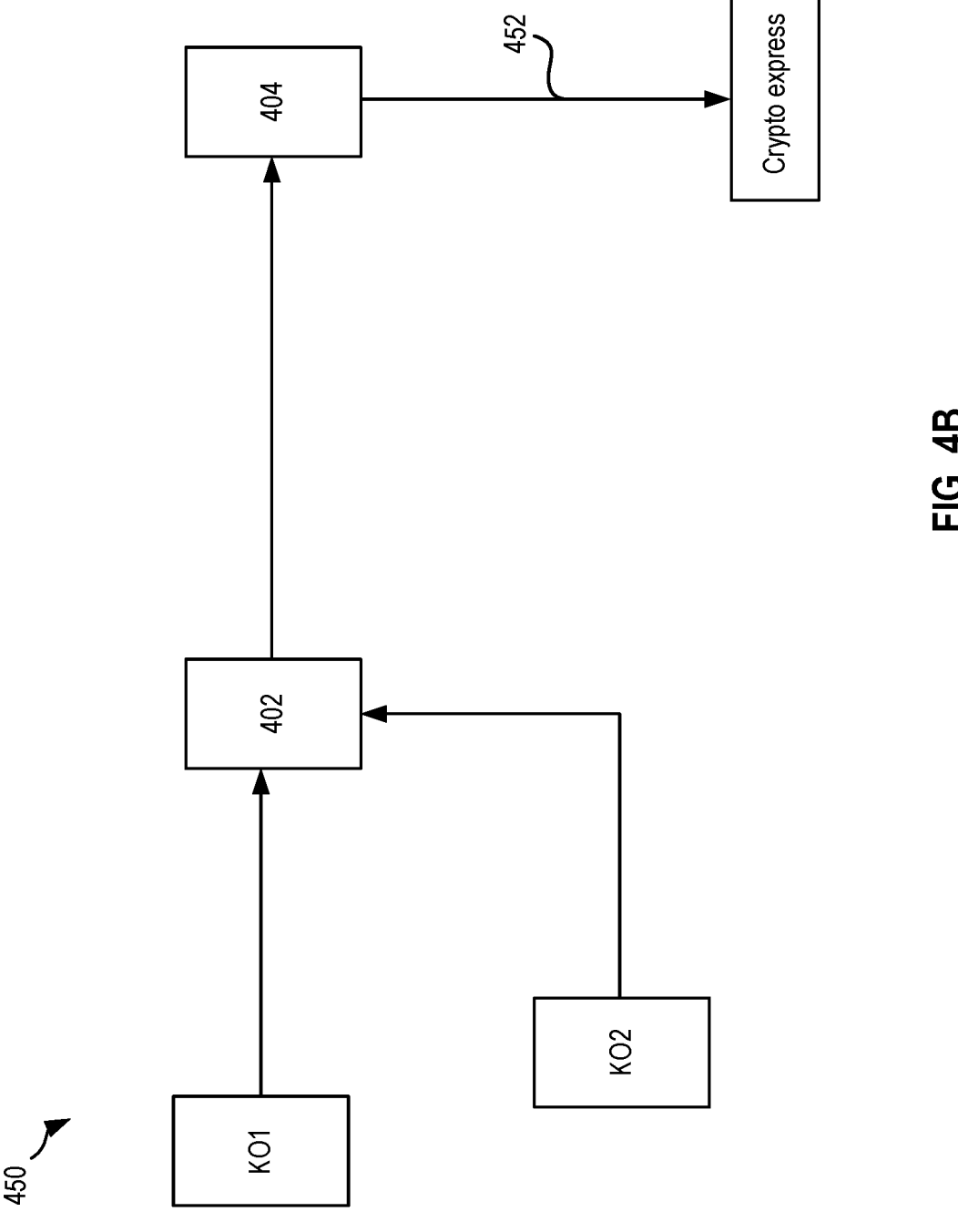
FIG. 4B depicts a load flowchart, in accordance with one approach of the present invention.

FIGS. 4A-4B depicts load flowcharts 400, 450, in accordance with several approaches. As an option, the present load flowcharts 400, 450 may be implemented in conjunction with features from any other approach listed herein, such as those described with reference to the other FIGS. Of course, however, such load flowcharts 400, 450 and others presented herein may be used in various applications and/or in permutations which may or may not be specifically described in the illustrative approaches listed herein. Further, the load flowcharts 400, 450 presented herein may be used in any desired environment.

Referring first to FIG. 4A, a first key officer, e.g., see KO1, may be relied on to authenticate a first TKE for a TKE loading component 402. Similarly, a second key officer, e.g., see KO2, may be relied on to authenticate a second TKE for the TKE loading component 402. The TKE loading component 402 is configured to load cryptographic recovery keys to a TKE workstation 404. Furthermore, the TKE workstation is configured to load cryptographic recovery keys portions into a primary cryptographic recovery key register on a predetermined card, e.g., see crypto express. More specifically, in operation 406 of FIG. 4A, a recovery cryptographic recovery key portion is loaded into the primary cryptographic recovery key register on the predetermined card. In contrast, in load flowchart 450, in operation 452 of FIG. 4B, the TKE workstation is configured to load cryptographic recovery keys portions into an alternate cryptographic recovery key register on the predetermined card. More specifically, in operation 452 of FIG. 4B, a recovery cryptographic recovery key portion is loaded into the alternate cryptographic recovery key register on the predetermined card.

Figure 5:
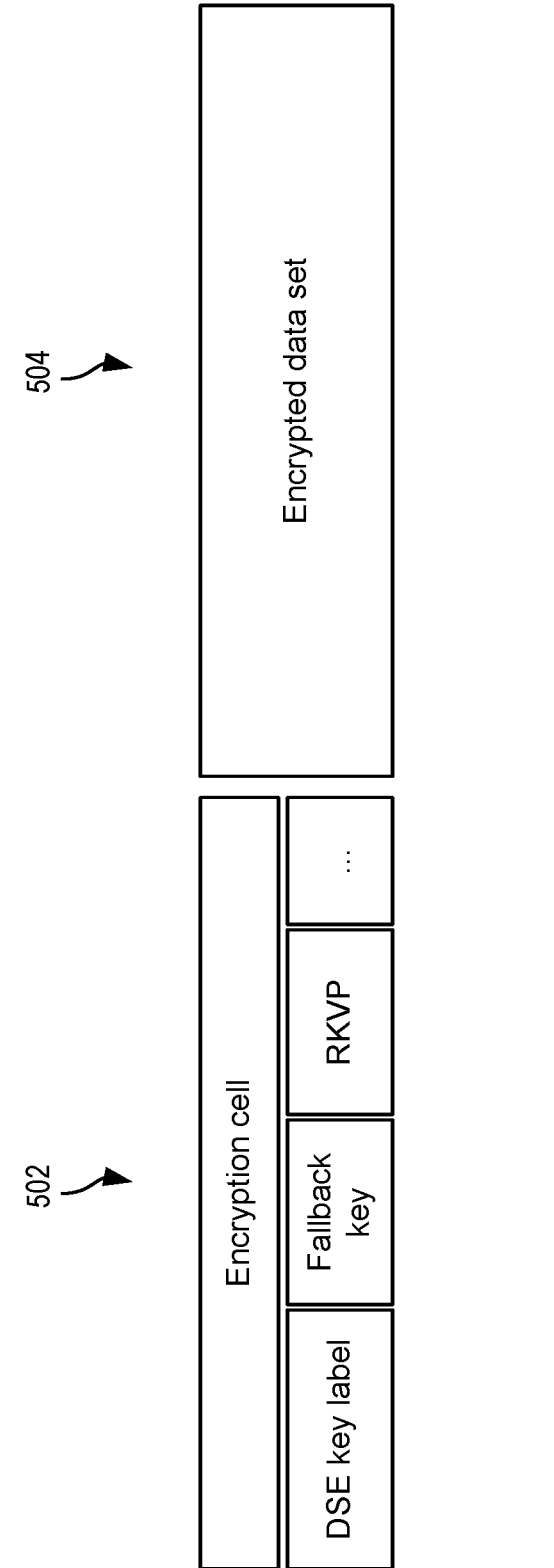
FIG. 5 depicts a structure, in accordance with one approach of the present invention.

FIG. 5 depicts a structure 500, in accordance with one approach. As an option, the present structure 500 may be implemented in conjunction with features from any other approach listed herein, such as those described with reference to the other FIGS. Of course, however, such structure 500 and others presented herein may be used in various applications and/or in permutations which may or may not be specifically described in the illustrative approaches listed herein. Further, the structure 500 presented herein may be used in any desired environment.

The structure 500 includes a data set encryption cell 502 and an encrypted data set 504, in accordance with one approach of the present invention. Within the data set encryption cell 502, the DSE key label encrypts the data set, and the fallback key is encrypted by the recovery key. Within techniques described herein, the data set encryption (DSE) key (also referred to herein as the "operational key") may be stored in two places, e.g., in the CKDS encrypted by the master key and in the data set encryption cell encrypted by the recovery key, e.g., fallback key.

The DSE key is preferably encrypted with the recovery key and stored in the data set encryption cell as the fallback key. A RKVP may also be stored in the encryption cell to ensure the recovery key on the crypto express adapter matches the recovery key used to create the fallback key. If the data set encryption key is deleted from the CKDS, the recovery key is able to be used to decrypt the fallback key that was stored with the encrypted data set.

In some illustrative approaches, in cases in which a recovery key is compromised or for periodic recovery key rotation, fallback keys can be re-enciphered. For example, a new multi-part recovery key may be generated and loaded using the TKE, and the encrypted data set may be opened. In some approaches, at data set open time, the DMS invokes ICSF to retrieve the protected key. At that time, ICSF may also call the adapter to retrieve the RKVP (for comparison) or fallback key (for replacement). Furthermore, DMS may be instructed to store the updated fallback key in the data set encryption cell. It should be noted that, in some approaches, data sets that are migrated or archived would need to be restored in order to have the fallback key re-enciphered.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method (CIM), the CIM comprising:

generating a primary cryptographic recovery key;

generating an alternate cryptographic recovery key, wherein the alternate cryptographic recovery key is generated and stored in a cryptographic Hardware Security Module (HSM), wherein the cryptographic HSM is a cryptographic key store configured to encrypt operational key(s);

storing an encrypted fallback key in metadata associated with a data set, wherein the encrypted fallback key is an operational key encrypted by the primary cryptographic recovery key, wherein the metadata is stored in a data set encryption cell that comprises a logical and physical portion of memory that is dedicated to storing key labels, Recovery Key Verification Patterns (RKVPs) and encrypted fallback keys;

storing a RKVP in the metadata in the data set encryption cell, wherein the RKVP is associated with the primary cryptographic recovery key and is stored for the primary cryptographic recovery key; and in response to a determination that the operational key is unavailable, retrieving the encrypted fallback key to perform a data decryption operation.

2. The CIM of claim 1, wherein retrieving the encrypted fallback key includes: determining whether an RKVP associated with a key label of a request for the data set matches the primary cryptographic recovery key, and in response to a determination that the RKVP associated with the key label matches the primary cryptographic recovery key: using the primary cryptographic recovery key to decrypt the encrypted fallback key; using a current master key stored in the cryptographic HSM to encrypt the decrypted fallback key; generating a protected key to be used for encrypting and decrypting the data set; storing the master key encrypted fallback key in a Cryptographic Key Data Set (CKDS); and returning both the protected key and the RKVP associated with the key label to an application programming interface (API) of a system that manages use of the fallback key and the data set.

3. The CIM of claim 2, comprising: determining whether the RKVP associated with the key label matches the RKVP stored in the metadata; and in response to a determination that the RKVP associated with the key label does not match the RKVP stored in the metadata, storing the master key encrypted fallback key and the RKVP associated with the key label to the metadata.

4. The CIM of claim 1, wherein the determination that the operational key is unavailable is based on an attempt to access the data set failing and predetermined recovery actions performed in an attempt to acquire the operational key to access the data set also failing.

5. The CIM of claim 1, wherein the data set is encrypted by the operational key, and comprising: receiving a request for the data set; and in response to receiving the request for the data set, performing a predetermined maintenance process, wherein the predetermined maintenance process includes: causing the cryptographic HSM to generate and return a protected key to be actively used for encryption and decryption of the data set; determining whether an RKVP associated with a key label of the request for the data set matches the primary cryptographic recovery key; and in response to a determination that the RKVP associated with a key label does not match the primary cryptographic recovery key, generating a new fallback key, wherein the new fallback key is encrypted by the primary cryptographic recovery key.

6. The CIM of claim 5, comprising: causing the RKVP associated with a key label to be compared with the RKVP stored in the metadata; and in response to a determination, from results of the comparison, that the RKVP associated with a key label does not match the RKVP stored in the metadata, causing the new fallback key and the RKVP associated with a key label to be stored in the metadata.

7. The CIM of claim 1, wherein retrieving the encrypted fallback key includes: determining whether an RKVP associated with a key label of a request for the data set matches the primary cryptographic recovery key; in response to a determination that the RKVP associated with the key label does not match the primary cryptographic recovery key, determining whether the RKVP associated with the key label matches the alternate cryptographic recovery key; in response to a determination that the RKVP associated with the key label does not match the alternate cryptographic recovery key, returning a failure to a device from which request for the data set is received; and in response to a determination that the RKVP associated with the key label matches the alternate cryptographic recovery key, performing a predetermined recover process, wherein the predetermined recover process includes: using the alternate cryptographic recovery key to decrypt the encrypted fallback key; encrypting the decrypted fallback key with a current master key stored in the cryptographic HSM; encrypting the decrypted fallback key with the primary cryptographic recovery key and returning the primary cryptographic recovery key encrypted fallback key and the RKVP associated with the key label to the device; generating a protected key to be actively used for encryption and decryption of the data set; and causing the master key encrypted fallback key and the RKVP associated with the key label in a Cryptographic Key Data Set (CKDS).

8. The CIM of claim 7, wherein the predetermined recover process includes: determining whether the RKVP associated with the key label matches the RKVP stored in the metadata; and in response to a determination that the RKVP associated with the key label does not match the RKVP stored in the metadata, causing the primary cryptographic recovery key encrypted fallback key and the RKVP associated with the key label to be stored in the metadata.

9. A computer program product (CPP), the CPP comprising:
a set of one or more computer-readable storage media; and program instructions, collectively stored in the set of one or more storage media, for causing a processor set to perform the following computer operations:

generate a primary cryptographic recovery key;

generate an alternate cryptographic recovery key, wherein the alternate cryptographic recovery key is generated and stored in a cryptographic Hardware Security Module (HSM), wherein the cryptographic HSM is a cryptographic key store configured to encrypt operational key(s);

store an encrypted fallback key in metadata associated with a data set, wherein the encrypted fallback key is an operational key encrypted by the primary cryptographic recovery key, wherein the metadata is stored in a data set encryption cell that comprises a logical and physical portion of memory that is dedicated to storing key labels, Recovery Key Verification Patterns (RKVPs) and encrypted fallback keys;

store a RKVP in the metadata in the data set encryption cell, wherein the RKVP is associated with the primary cryptographic recovery key and is stored for the primary cryptographic recovery key; and in response to a determination that the operational key is unavailable, retrieve the encrypted fallback key to perform a data decryption operation.

10. The CPP of claim 9, wherein retrieving the encrypted fallback key includes: determining whether an RKVP associated with a key label of a request for the data set matches the primary cryptographic recovery key, and in response to a determination that the RKVP associated with the key label matches the primary cryptographic recovery key: using the primary cryptographic recovery key to decrypt the encrypted fallback key; using a current master key stored in the cryptographic HSM to encrypt the decrypted fallback key; generating a protected key to be used for encrypting and decrypting the data set; storing the master key encrypted fallback key in a Cryptographic Key Data Set (CKDS); and returning both the protected key and the RKVP associated with the key label to an application programming interface (API) of a system that manages use of the fallback key and the data set.

11. The CPP of claim 10, comprising: program instructions, collectively stored in the set of one or more storage media, for causing the processor set to perform the following computer operations: determine whether the RKVP associated with the key label matches the RKVP stored in the metadata; and in response to a determination that the RKVP associated with the key label does not match the RKVP stored in the metadata, store the master key encrypted fallback key and the RKVP associated with the key label to the metadata.

12. The CPP of claim 9, wherein the determination that the operational key is unavailable is based on an attempt to access the data set failing and predetermined recovery actions performed in an attempt to acquire the operational key to access the data set also failing.

13. The CPP of claim 9, wherein the data set is encrypted by the operational key, and comprising: program instructions, collectively stored in the set of one or more storage media, for causing the processor set to perform the following computer operations: receive a request for the data set; and in response to receiving the request for the data set, perform a predetermined maintenance process, wherein the predetermined maintenance process includes: causing the cryptographic HSM to generate and return a protected key to be actively used for encryption and decryption of the data set; determining whether an RKVP associated with a key label of the request for the data set matches the primary cryptographic recovery key; and in response to a determination that the RKVP associated with a key label does not match the primary cryptographic recovery key, generating a new fallback key, wherein the new fallback key is encrypted by the primary cryptographic recovery key.

14. The CPP of claim 13, program instructions, collectively stored in the set of one or more storage media, for causing the processor set to perform the following computer operations: cause the RKVP associated with a key label to be compared with the RKVP stored in the metadata; and in response to a determination, from results of the comparison, that the RKVP associated with a key label does not match the RKVP stored in the metadata, cause the new fallback key and the RKVP associated with a key label to be stored in the metadata.

15. The CPP of claim 9, wherein retrieving the encrypted fallback key includes: determining whether an RKVP associated with a key label of a request for the data set matches the primary cryptographic recovery key; in response to a determination that the RKVP associated with the key label does not match the primary cryptographic recovery key, determining whether the RKVP associated with the key label matches the alternate cryptographic recovery key; in response to a determination that the RKVP associated with the key label does not match the alternate cryptographic recovery key, returning a failure to a device from which request for the data set is received; and in response to a determination that the RKVP associated with the key label matches the alternate cryptographic recovery key, performing a predetermined recover process, wherein the predetermined recover process includes: using the alternate cryptographic recovery key to decrypt the encrypted fallback key; encrypting the decrypted fallback key with a current master key stored in the cryptographic HSM; encrypting the decrypted fallback key with the primary cryptographic recovery key and returning the primary cryptographic recovery key encrypted fallback key and the RKVP associated with the key label to the device; generating a protected key to be actively used for encryption and decryption of the data set; and causing the master key encrypted fallback key and the RKVP associated with the key label in a Cryptographic Key Data Set (CKDS).

16. The CPP of claim 15, wherein the predetermined recover process includes: determining whether the RKVP associated with the key label matches the RKVP stored in the metadata; and in response to a determination that the RKVP associated with the key label does not match the RKVP stored in the metadata, causing the primary cryptographic recovery key encrypted fallback key and the RKVP associated with the key label to be stored in the metadata.

17. A computer system (CS), the CS comprising:
a processor set;
a set of one or more computer-readable storage media;
program instructions, collectively stored in the set of one or more storage media, for causing the processor set to perform the following computer operations:

generate a primary cryptographic recovery key;
generate an alternate cryptographic recovery key, wherein the alternate cryptographic recovery key is generated and stored in a cryptographic Hardware Security Module (HSM), wherein the cryptographic HSM is a cryptographic key store configured to encrypt operational key(s);
store an encrypted fallback key in metadata associated with a data set, wherein the encrypted fallback key is an operational key encrypted by the primary cryptographic recovery key, wherein the metadata is stored in a data set encryption cell that comprises a logical and physical portion of memory that is dedicated to storing key labels, Recovery Key Verification Patterns (RKVPs) and encrypted fallback keys;
store a RKVP in the metadata in the data set encryption cell, wherein the RKVP is associated with the primary cryptographic recovery key and is stored for the primary cryptographic recovery key; and
in response to a determination that the operational key is unavailable, retrieve the encrypted fallback key to perform a data decryption operation.

18. The CS of claim 17, wherein retrieving the encrypted fallback key includes: determining whether an RKVP associated with a key label of a request for the data set matches the primary cryptographic recovery key, and in response to a determination that the RKVP associated with the key label matches the primary cryptographic recovery key: using the primary cryptographic recovery key to decrypt the encrypted fallback key; using a current master key stored in the cryptographic HSM to encrypt the decrypted fallback key; generating a protected key to be used for encrypting and decrypting the data set; storing the master key encrypted fallback key in a Cryptographic Key Data Set (CKDS); and returning both the protected key and the RKVP associated with the key label to an application programming interface (API) of a system that manages use of the fallback key and the data set.

19. The CS of claim 18, comprising: program instructions, collectively stored in the set of one or more storage media, for causing the processor set to perform the following computer operations: determine whether the RKVP associated with the key label matches the RKVP stored in the metadata; and in response to a determination that the RKVP associated with the key label does not match the RKVP stored in the metadata, store the master key encrypted fallback key and the RKVP associated with the key label to the metadata.

20. The CS of claim 17, wherein the determination that the operational key is unavailable is based on an attempt to access the data set failing and predetermined recovery actions performed in an attempt to acquire the operational key to access the data set also failing.

* * * * *